United States Patent
Kaneko

[11] Patent Number: 5,016,094
[45] Date of Patent: May 14, 1991

[54] WHITE BALANCE CORRECTION APPARATUS

[75] Inventor: Kiyotaka Kaneko, Tokyo, Japan

[73] Assignee: Fuji Photo Film Co., Ltd., Kanagawa, Japan

[21] Appl. No.: 304,197

[22] Filed: Jan. 31, 1989

[30] Foreign Application Priority Data

Feb. 3, 1988 [JP] Japan ............... 63-13258[U]

[51] Int. Cl.$^5$ ................. H04N 9/64; H04N 9/73
[52] U.S. Cl. ............................. 358/41; 358/29
[58] Field of Search ............ 358/41, 29 C, 43, 44, 358/29

[56] References Cited
U.S. PATENT DOCUMENTS

| | | | |
|---|---|---|---|
| 4,584,598 | 4/1986 | Kutaragi | 358/29 |
| 4,595,946 | 6/1986 | Uehara et al. | 358/29 |
| 4,739,393 | 4/1988 | Seki et al. | 358/29 C |
| 4,774,564 | 9/1988 | Konishi | 358/41 |
| 4,833,525 | 5/1989 | Suzuki et al. | 358/29 C |

FOREIGN PATENT DOCUMENTS 0218995 1/1985 Japan ................. 358/29 C

*Primary Examiner*—Howard W. Britton
*Assistant Examiner*—Michael H. Lee

[57] ABSTRACT

A white balance correction apparatus for electronic cameras is provided with a first photosensor which photometries a first light from the environment including a scene to be taken and a second photo sensor which photometries a second light from the scene. First and second identification circuits electrically identify the light sources of the first and second lights respectively based on electrical signals from the first and second photosensors. From the result of the identification of the light sources, an operation mode of a white balance correction circuit is selected from among three operation modes: one of a normal mode is which white balance correction is carried out according to a color temperature of the first light, a fluorescent lamp mode in which white balance correction is carried out to avoid a tinged image due to a fluorescent lamp, and a manual mode in which white balance correction is carried out according to a color temperature which is manually set is selected.

4 Claims, 2 Drawing Sheets

WHITE BALANCE CORRECTION APPARATUS

BACKGROUND OF THE INVENTION

The present invention relates to a white balance correction apparatus in electronic cameras producing color video images with an excellent color balance even when an outdoor main subject in daylight is taken from the inside of a house under artificial light through a window.

Generally, electronic cameras such as electronic still cameras, video cameras, and so forth incorporate therein an automatic white balance correction apparatus which automatically controls gains of signals of primary color components of light, provided by an image sensor such as CCDs, according to color temperatures of light entering the image sensor from a scene or an environment including the scene, thereby producing an image with naturally balanced color.

Such an automatic white balance correction apparatus is very useful and effective, especially when a subject is photographed by the electric camera under artificial light, such as emitted from a fluorescent lamp. Though an image taken under light of a fluorescent lamp is generally tinged with blue because the color temperature of light from the fluorescent lamp is higher than that of standard daylight, the automatic white balance correction apparatus can correct undesirable color balance of the image.

When a subject is illuminated with a fluorescent lamp, the amount of light from the subject illuminated with the fluorescent lamp is not always sufficient to photograph an image of the subject by the electronic camera and also, the light flickers at a commercial power-frequency (50 or 60 Hz). Therefore, because the color temperature of the light from a scene under lighting of fluorescent lamps is hard to measure precisely in the same way as available for the scene in daylight, the automatic white balance correction apparatus is used to judge automatically whether the light source illuminating a scene is a fluorescent lamp or not by detecting the flickering of light. When the white balance correction apparatus judges the light source to be a fluorescent lamp, it operates in a fluorescent mode to measure the color temperature without the influences of the flickering of light.

There are two types of methods of measurement of color temperatures; one measurement makes use of light which comes from a scene to be taken through a taking lens system of the electronic camera, the other measurement makes use of light from an environment including the scene.

The former method of measurement has an advantage that even if there is an artificial light source in the environment but out of a scene to be taken, the light source does not affect this measurement. However, if the color balance of the scene is improper, desirable color correction is difficult to achieve due to color failure. On the other hand, the latter has an advantage that, even if there is an artificial light source, the color correction is not affected by this color failure. However, if a subject out of doors in daylight is photographed with the electronic camera through a window, a video image of the scene is imbalanced in color because the automatic white balance apparatus is set in the fluorescent lamp mode of operation.

OBJECT OF THE PRESENT INVENTION

It is, therefore, an object of the present invention to provide a white balance correction apparatus which can correct the white balance of a video image by identifying both environment and scene light sources.

SUMMARY OF THE INVENTION

For achieving the above and other objects and advantages, a white balance correction apparatus according to the present invention comprises a first photometry means for generating a first photometry signal by receiving light from the second photometry means for generating a second photometry signal by receiving light from the scene through a taking lens system, first and second identification means for judging whether the lights are from an artificial light source or not based on the first and second photometry signals to generate first and second identification signals respectively, and a mode selector for selecting any of white balance correction modes, namely a fluorescent lamp mode, a manual mode, and a normal mode, based on combinations of the first and second identification signals.

In the white balance correction apparatus, a plurality of white balance correction modes are selectively available for more accurate white balance correction and they are selectively actuated as a result of identification of light sources of environment and scene lights. In a preferred embodiment of the present invention, the identification is to judge whether a light source is a fluorescent lamp or not. Therefore, even if a subject out of doors in daylight is photographed through a window from indoors, accurate white balance correction can be done, thereby reproducing good-looking video images because of excellent color reproducibility.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the invention will be seen by reference to the following description, taken in connection with the accompanying drawings which are given by way of illustration only, and thus are not limitative of the present invention, and in which.

DETAILED DESCRIPTION OF THE INVENTION

Figure 1:
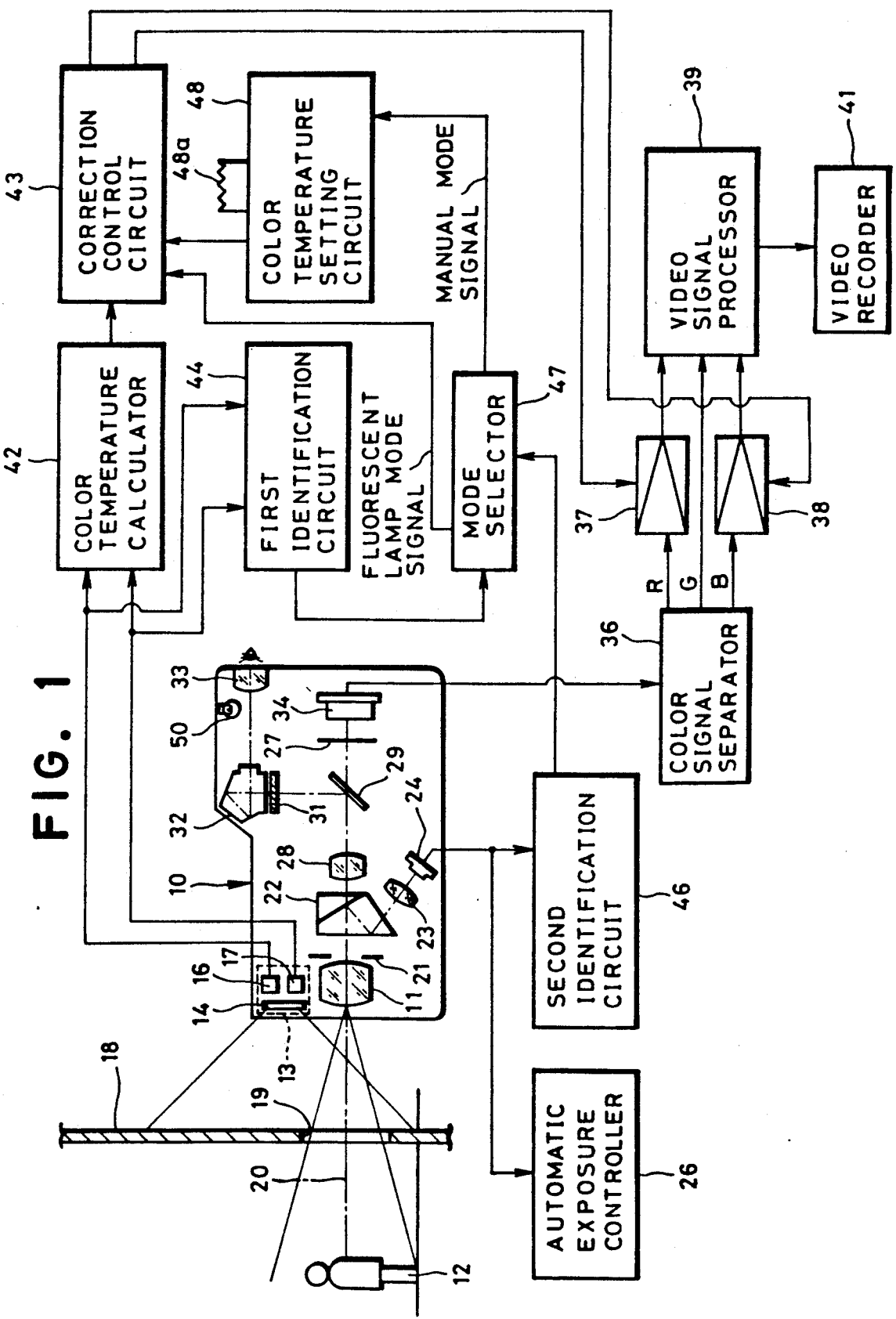
FIG. 1 is a schematic diagram illustrating an electronic still camera embodying the present invention.

Referring now to the attached drawings, a white balance correction apparatus according to the present invention will be described in detail. In FIG. 1 showing a schematic diagram of the electronic still camera, a taking lens system 11 is provided in the front of the camera body 10 to form an image of a scene behind the taking lens system 11 with a manual focusing mechanism.

Provided above the taking lens system 11 in the camera is a white balance sensor 13 comprising a diffusion plate 14 and red and blue sensors 16 and 17 disposed behind the diffusion plate 14. A red filter is provided in front of the red sensor 16 and a blue filter is provided in front of the blue sensor 17.

The angle of view of the taking lens system 11 ranges from 15 degrees to 60 degrees according to the focal length thereof and the light receiving angle of the white balance sensor 13 is set generally about 90 degrees to avoid poor white balance correction.

An aperture-stop 21 and a beam splitter 22 are provided in an optical path 20 of the taking lens system 11. Incident light into the taking lens system 11 passes through the aperture-stop 21 when fully open, reaching the beam splitter 22 with which the light is split into two light beams. One of the light beams reaches, through a lens 23, an AE (automatic exposure control) sensor 24 which generates a photoelectrical signal with a level proportional to the intensity of the incident light to an automatic exposure controller 26. This automatic exposure controller 26 automatically determines the exposure condition of the F-number of the aperture-stop 21 and the open time (exposure time) of a shutter 27 based on the photoelectrical signal.

The other beam passing straight through the beam splitter 22 further passes on the optical axis 20 through a lens 28. When a movable mirror 29 is in its lower position as shown in FIG. 1, the beam is upwardly reflected from the movable mirror 29 to form an image of a scene on a focusing glass 31 for viewfinding. The image on the focusing glass 31 is viewed through a penta prism 32 and an eye-piece 33. On the contrary, when the movable mirror is in its upper position by operation of a shutter button (not shown), the beam can go straight through the opened shutter 27 to form an image on the photoelectric surface of an imaging unit 34.

The imaging unit 34 comprises a color filter arranged with red, green, and blue filter areas in dot pattern and a CCD image sensor disposed behind the color filter and generates photoelectrical signals, which are sent to a color signal separator 36 for amplifying the photoelectrical signals and separating the signals into three primary color signals R, G, and B. Only the green color signal G is directly supplied to a video signal processor 39 and the red and blue color signals R and B are supplied to the same after amplification with red and blue gain control amplifiers 37 and 38. In the video signal processor 39, matrix computing and color encoding are performed for the green color signal G and the amplified red and blue color signal R and B in order to produce a composite video signal in the form in conformity to a standard color television system, e.g., NTSC television system. The produced composite video signal is recorded on a still video floppy with a video recorder 41.

The red and blue signals from the white balance sensor 13 are fed to a color temperature calculator 42 for calculating color temperature of the environment light. The color temperature calculator 42 generates a color temperature signal representing the calculated color temperature and sends it to a correction control circuit 43. The correction control circuit 43 supplies red and blue correction control signals corresponding to the received color temperature signals to the red and blue gain control amplifiers 37 and 38 respectively. If the color temperature is, for example, rather high, the gain of the red gain control amplifier 37 is set large and the gain of the blue gain control amplifier 38 is set small. As the white balance is thus corrected, a color video signal with natural color balance is output from the video signal processor 39.

The red and blue signals from the red and blue sensors 16 and 17 or one of the signals is also fed to a first identification circuit 44 to identify the light source, that is, to judge whether the light source is a fluorescent lamp or not by detecting whether or not the signals include a ripple component of commercial power-frequency over a predetermined level. When the first identification circuit 44 detects significant ripple component, the circuit 44 generates a first identification signal representing that the light source of the environment light is a fluorescent lamp. The photoelectrical signal from the AE sensor 24 is fed not only to the aforementioned automatic exposure controller 26 but also to a second identification circuit 46 which is the same kind as the first identification circuit 44. The second identification circuit 46 also detects whether a ripple component above a predetermined level is included or not, and when the circuit 46 as well as the first identification circuit 44 identifies the light source of the light through the taking lens system 11 to be a fluorescent lamp, the circuit 46 generates a second identification signal.

The first and second identifying circuits 44 and 46 are connected with a mode selector 47 which selects one mode among three operation modes of the correction control circuit 43 based on combination of the first and second identification signals, as listed in the table below.

TABLE

Operation Mode According to Combination of First & Second Identification Signals

| First Identification Signal | Second Identification Signal | Operation Mode |
|---|---|---|
| Generated | Generated | Fluorescent Lamp Mode |
| Generated | Not Generated | Manual Mode |
| Not Generated | Generated | Fluorescent Lamp Mode |
| Not Generated | Not Generated | Normal Mode |

In the table, for example, when the first and second identification circuits both generate the respective first and second identification signals, the operation mode of the correction control circuit 43 is set in the fluorescent lamp mode.

Whenever the fluorescent lamp mode is selected with the mode selector 47, the mode selector 47 sets the correction control circuit 43 in the fluorescent lamp mode. Since the color temperature signal from the color temperature calculator 42 periodically varies in level due to flickering of the fluorescent lamps in this case, the correction control circuit 43 samples a value of the color temperature signal. For instance, the peak value of the varying color temperature signal is sampled. Corresponding to the sampled color temperature signal, the correction control circuit 43 sends red and blue correction control signals to the red and blue gain control amplifiers 37 and 38 to set the gains of the red and blue control amplifiers 37 and 38.

Though in the above description the correction control circuit 43 in the fluorescent lamp mode controls the gain control amplifiers 37 and 38 according to the sampled color temperature signal, the correction control circuit 43 may unconditionally set the gains of the gain control amplifiers 37 and 38 at predetermined values independent of the color temperature signal.

When the manual mode is selected, the mode selector 47 sends a manual mode signal to a color temperature setting circuit 48 to make the circuit 48 operable and to light a warning lamp 50 in the viewfinder. The color temperature setting circuit 48 is provided with a knob 48a for manually setting color temperature. When the color temperature setting circuit 48 is operable, manual selection of color temperatures among 7500K, 5500K, and 3200K is possible by setting the knob 48a. According to the selection, the color temperature setting circuit 48 supplies a color temperature setting signal to the correction control circuit 43. Only when the correction control circuit 43 receives the color temperature setting signal, the correction control circuit 43 preferentially controls the red and blue gain control amplifiers 37 and 38, thus achieving the white balance correction manually.

Lastly, when the mode selector 47 selects the normal mode, the correction control circuit 43 operates in this normal mode to generate the red and blue correction control signals only depending on the color temperature signal from the color temperature calculator 42. Thus, the red and blue gain control amplifiers 37 and 38 correct the white balance automatically.

Figure 2:
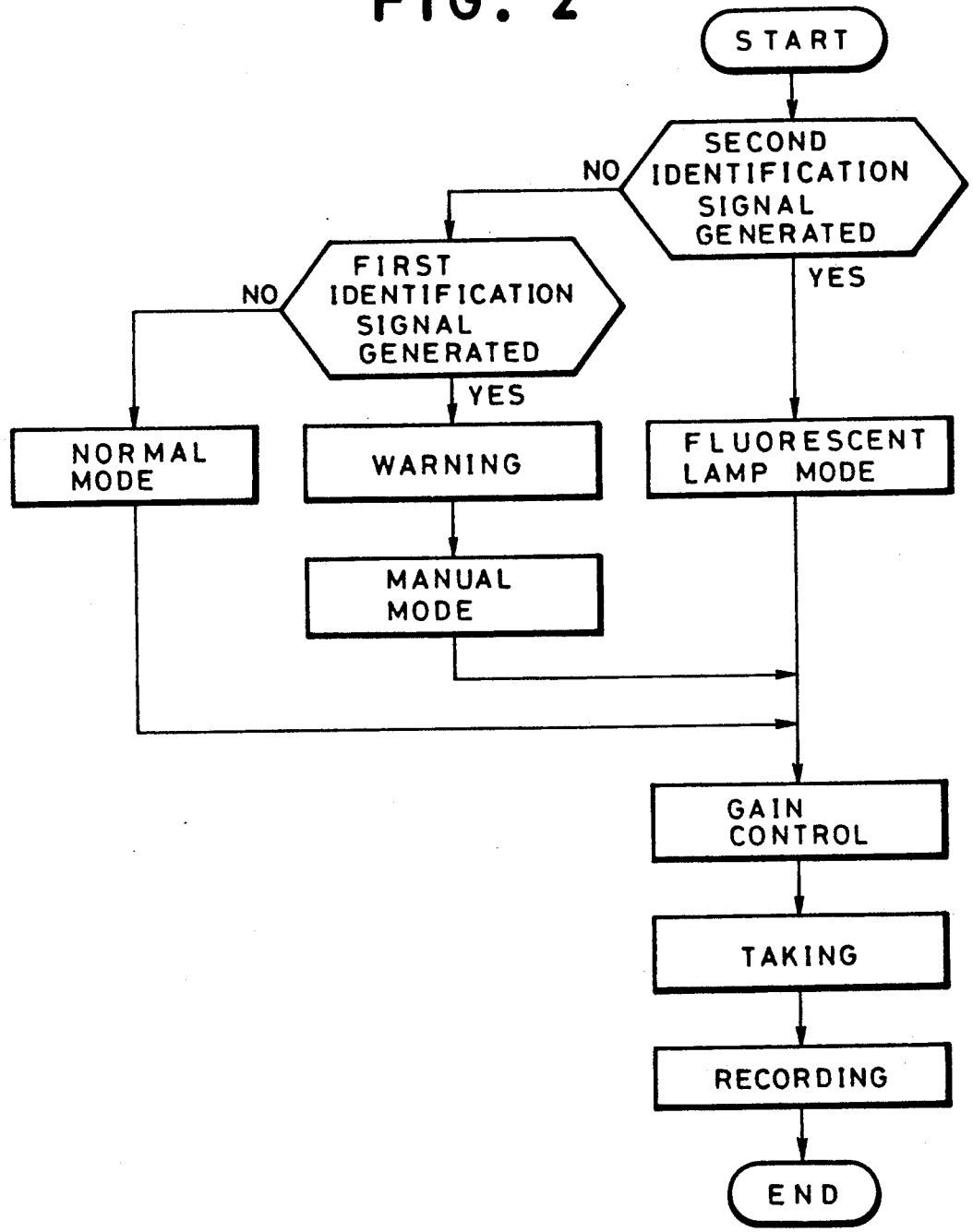
FIG. 2 is a flow chart showing the operation of an electronic still camera of FIG. 1.

Referring now to FIGS. 1 and 2, the operation of the embodiment of the present invention will be explained as stated below. Assume that a special scene is photographed with the electronic still camera. That is, a main subject 12 out of doors in daylight is taken through a window 19 in the wall 18 of a room with the electronic still camera which is in the room lighted with fluorescent lamps as shown in FIG. 1.

When the camera is aimed at the main subject 12 before taking a scene, the white balance sensor 13 receives the environment light including daylight through the window 19 and light originating from the fluorescent lamps because of its wide light receiving angle of about 90 degrees, in this embodiment. Therefore, the outputs of the red and blue sensors 16 and 17 include a component varying due to the flickering of the fluorescent lamps. Though the outputs are sent to the color temperature calculator 42 for generating a color temperature signal, this color temperature signal is not used in such special scene as described below. The outputs are sent also to the first identification circuit 44, which judges the output signals to include a ripple component over a predetermined level. Consequently, the first identification signal from the first identification circuit 44 is sent to the mode selector 47.

On the other hand, the AE sensor 24 receives the light from the outdoor scene through the taking lens system 11. Therefore, in this special case, the light originates from the sunshine even though the camera is in a room. Based on the output of the AE sensor 24, the second identification circuit 46 judges that the light does not include a ripple component, generating no second identification signal.

The mode selector 47 thus receives only the first identification signal, resultantly selecting the manual mode for the operation mode of the correction control circuit 48 to send a manual mode signal to the color temperature setting circuit 48. Hence, the color temperature setting circuit 48 is made operable and the warning lamp 50 turns on.

The turning-on of the warning lamp 50 means that if this special scene is taken in the normal mode, the produced video image is seriously off the color balance. Therefore, the knob 48a must be manually operated to make the color temperature setting according to the kind of light source. In this case, as the light source is sunshine, the color temperature is set 5500K. At this time, the color temperature signal from the color temperature calculator 42 is ignored due to the manual mode signal. The correction control circuit 43 generates the red and blue correction control signals meeting condition of the color temperature manually set with the knob 48a, making it possible to produce good-looking video image without influence of the fluorescent lamps.

Next, suppose another special case for the second example. This case is that a subject indoors lighted with fluorescent lamps is taken from outside through a window just contrary to the case described above and shown in FIG. 1. In this case, the white balance sensor 13 detects daylight and as a result, the first identification circuit 44 does not generate a first identification signal. The AE sensor 24, however, receives light originating from the fluorescent lamps, causing the second identification signal to be generated. Therefore, the fluorescent lamp mode is selected with the mode selector 47, which sends a fluorescent lamp mode signal to the correction control circuit 43 so as to operate the same in the fluorescent lamp mode. Thus, the red and blue gain control amplifiers are controlled to make an accurate correction for the fluorescent lamp independent of the daylight.

Further, when both the first and second identification signals are generated, this means that a subject lighted by fluorescent lamps is taken indoors. Accordingly, the correction control circuit 43 controls the red and blue gain control amplifiers 37 and 38 in its fluorescent lamp mode.

Still further, when the first and second identification circuit 44 and 46 generate no first and second identification signals, the correction control circuit 43 operates in the normal mode in which the correction control circuit 43 generates a correction control signal corresponding to the color temperature signal from the color temperature calculator 42. Thus, the red and blue gain control amplifiers 37 and 38 correct the color balance of the video image according to the red and blue correction control signals.

When a shutter button is depressed down after the setting of control for the red and blue gain control amplifiers 37 and 38, the automatic exposure controller 26 automatically sets the F-number of the aperture-stop 21 and length of an exposure time, according to the output level of the AE sensor 24 so as to expose with a proper amount of light and immediately thereafter the shutter 27 opens and closes. An optical image focused on the image sensor unit 34 during the opening of the shutter 27 is photoelectrically converted into a photoelectrical signals which are separated into three primary color signals R, G, and B with the color signal separator 36.

The two primary color signals R and B are fed to the video signal processor 39 through the red and blue gain control amplifiers 37 and the green primary color signal G is directly fed to the video signal processor 39. As described before, since the correction control circuit 43 is set in one of the operation modes, namely, normal mode, manual mode, and fluorescent lamp mode and thereby the red and blue gain control amplifiers R and B are controlled in gain, the primary color signals R and B are supplied to the video signal processor 39 as standard signals which are properly corrected with respect to the color temperatures of the environment and scene lights. The green primary color signal G is also used for a luminance signal of the NTSC television composite video signal. This composite video signal with excellent color balance is recorded on a still video floppy disk.

The present invention can be obviously applicable not only to such electronic still camera of this embodiment but also to a video camera. Although one embodiment of the present invention has been disclosed and described, it is apparent that other embodiments and modifications of the invention are possible.

What is claimed is:

1. A white balance correction apparatus used for electronic cameras having a taking lens system and imaging means, comprising:

first photometry means for measuring a first light from an environment including a scene to be photographed and generating a first photometry signal;

second photometry means for measuring a second light from the scene through the taking lens system and generating a second photometry signal;

first identification means for identifying a light source of the first light based on the first photometry signal and generating a first identification signal representing a result of the first identification;

second identification means for identifying a light source of the second light and generating a second identification signal representing a result of the second identification;

a mode selector for selecting one of white balance correction modes based on a combination of the first and second identification signals; and correction control means for adjusting the gain of primary color signals output from the imaging means according to the selected white balance correction mode, the first and second identification means respectively identify whether the light sources are fluorescent lamps based on detection of ripple in the first and second photometry signals.

2. A white balance correction apparatus as claimed in claim 1, wherein the primary color signals are red color and blue color signals.

3. A white balance correction apparatus as claimed in claim 2, the white balance correction modes include a normal mode in which a white balance correction is carried out depending on a color temperature of the first light when neither of the first and second light sources of the respective first and second lights are fluorescent lamps, a fluorescent lamp mode in which white balance correction for avoiding a tinged image due to fluorescent lamp sources is carried out when the light source of the second light is a fluorescent lamp, and a manual mode in which a white balance correction is carried out depending on a color temperature which is manually set when the light source of the first light is a fluorescent lamp.

4. A white balance correction apparatus as claimed in claim 3, a light receiving angle of said first photometry means, taken with respect to an optical axis projecting from the taking lens system to the scene, is about 90 degrees and a light receiving angle of said second photometry means ranges from 15 to 60 degrees.

* * * * *